Sept. 28, 1926.

W. H. T. HOLDEN 1,601,021

SUPERIMPOSED RINGING SYSTEM

Filed August 19, 1924    2 Sheets-Sheet 1

INVENTOR
W.H.T. Holden
BY
ATTORNEY

Sept. 28, 1926.

W. H. T. HOLDEN

SUPERIMPOSED RINGING SYSTEM

Filed August 19, 1924   2 Sheets-Sheet 2

1,601,021

INVENTOR
W. H. T. Holden
BY
ATTORNEY

Patented Sept. 28, 1926.

1,601,021

UNITED STATES PATENT OFFICE.

WILLIAM H. T. HOLDEN, OF BROOKLYN, NEW YORK, ASSIGNOR TO AMERICAN TELEPHONE AND TELEGRAPH COMPANY, A CORPORATION OF NEW YORK.

SUPERIMPOSED RINGING SYSTEM.

Application filed August 19, 1924. Serial No. 733,029.

This invention relates to superimposed ringing systems such as are used in party-line telephone systems, and particularly to means for generating an alternating wave superimposed upon a unidirectional current, which unidirectional current is produced by condensers instead of by batteries as in the systems of the prior art.

In the superimposed ringing systems for party-line telephony, it has been customary heretofore to create the superimposed wave by generating an alternating voltage and superimposing it upon a direct current voltage created either by storage batteries or dry cells of the required voltage. These direct current sources are expensive to install and also to maintain.

It is one of the objects of the present invention to avoid this cost by providing a system in which the batteries of the prior art are replaced by an electrolytic condenser or other suitable type of condenser of very large capacity which is maintained in a charged condition by a small half wave rectifier of any suitable type. In my system, one rectifier and one condenser are required for each polarity of superimposed ringing current. The condensers are of such capacity that they will discharge only slightly during the half cycle in which the rectifier does not pass a current. Through the use of such condensers a unidirectional voltage of substantially uniform value is maintained across the bus-bars of the ringing systems or between a bus-bar and ground, and the superimposed alternating voltage is simultaneously impressed upon this unidirectional voltage.

Figure 1:
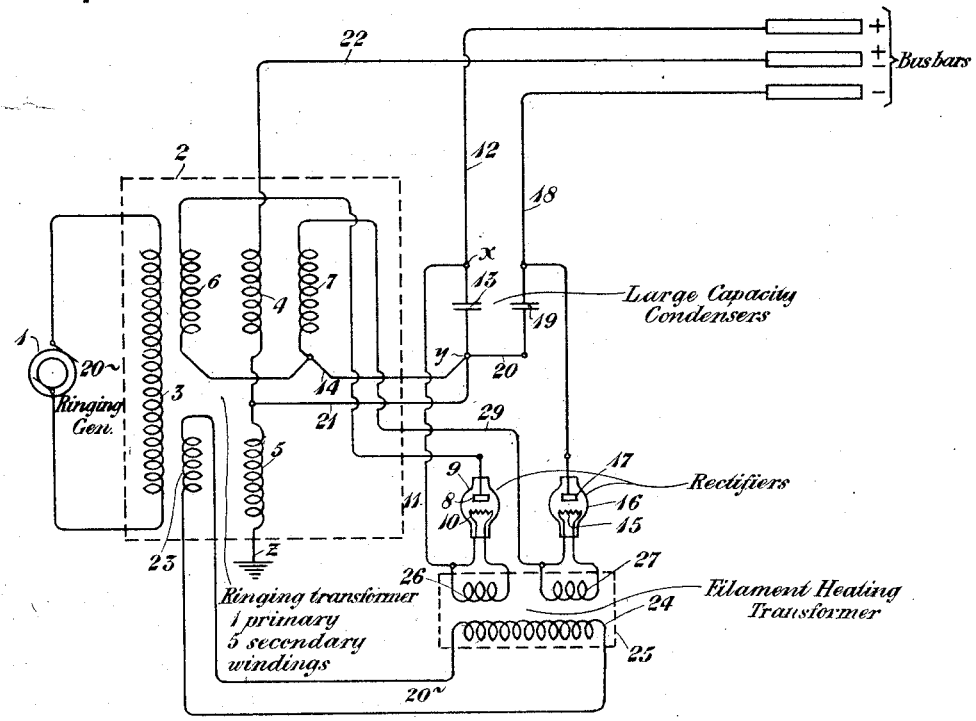
Figure 2:
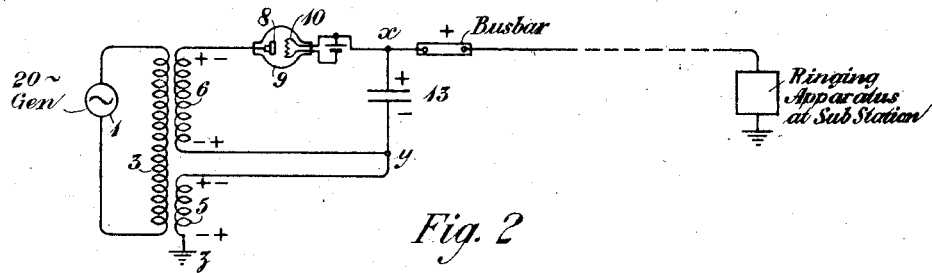
Figure 3:
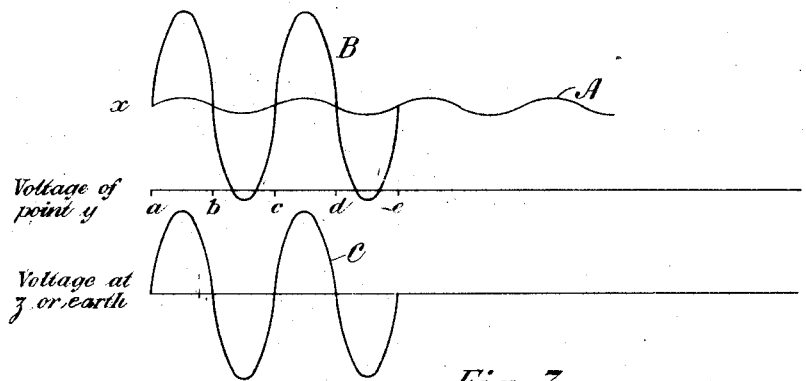
Figure 4:
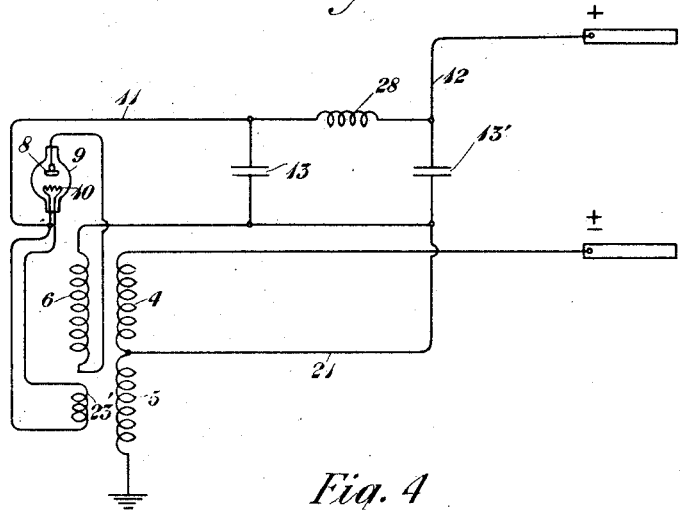

The invention will be clearly understood from the following description when read in connection with the attached drawing of which Figure 1 shows schematically a general form of embodiment of my invention; Fig. 2 shows in simplified form one of the circuits of Fig. 1; Fig. 3 is a voltage chart used in the description of Fig. 1; and Fig. 4 is a modification of part of the circuit shown in Fig. 1.

In Fig. 1, a source 1 of alternating potential, such, for example, as 20 cycle ringing voltage, is connected with the primary winding 3 of the transformer 2 which embodies the various windings included within the dotted lines. This transformer includes a plurality of secondary windings 4, 5, 6 and 7. Windings 4 and 5, which are shown separately, may be combined as a single winding having a tap taken from a predetermined point therein. Windings 6 and 7 furnish the voltage required to charge the condensers by means of which the unidirectional voltage is applied to the bus-bars. The upper terminal of winding 6 is connected with the anode 8 of the rectifier 9 of which the cathode 10 is connected by means of conductor 11 with conductor 12 at a point to one side of the condenser 13. The other plate of this condenser is connected by conductor 14 with the winding 6. The upper terminal of the winding 7 is connected with the cathode 15 of the rectifier 16, the anode 17 of which is connected with the conductor 18 to one side of the condenser 19, the other plate of which is connected by conductors 20 and 14 with the other side of the winding 7. Conductor 12 extends to the positive bus-bar, and conductor 18 to the negative bus-bar of the ringing system. The windings 4 and 5 are connected by means of conductor 22 with the alternating potential bus-bar of the system. Windings 6 and 7 are connected by conductors 14 and 21 to ground so that both of the superimposed voltages are applied between the bus-bars and ground. The current necessary to heat the cathodes of the rectifiers is provided by means of the winding 23 of transformer 2 which is connected with the winding 24 of transformer 25. The secondary windings 26 and 27 of this transformer are connected with the cathodes 10 and 15, respectively.

The manner in which this system operates to produce the superimposed voltages is as follows: Current from the source 1 flowing through the winding 3 energizes all of the secondary windings of this transformer. For the sake of clearness, the circuit for the positive superimposed voltage will be first considered. This circuit is shown in simplified form in Fig. 2, and reference will be made thereto. When the applied voltage wave is such that the upper terminal of winding 6 is positive (its lower terminal being negative), current will flow from the anode 8 across the gap of the tube to the cathode 10, thence over conductor 11, through the condenser 13 and over conductor 14 to the negative terminal of winding 6. This charges the condenser 13 to its capacity. The charging of this condenser will also raise its voltage slightly during the half cycle of charging, which is represented by that part of curve A during the interval of time ab. When the applied ac voltage reverses in polarity, the upper terminal of winding 6 becomes negative and its lower terminal positive. This makes the anode 8 of the rectifier 9 negative, and consequently there will be no flow of current across the gap of the rectifier. Consequently the condenser 13 will not be charged during the half cycle bc, and the condenser will discharge, which will produce a slight falling off in voltage. By making the condenser 13 very large relative to the drain upon it by the circuits to be supplied, the voltage variation may be reduced to a minimum. From the foregoing description, an understanding will be had of the method of producing the direct current component of the superimposed voltage. The alternating voltage which is superimposed upon this direct or unidirectional voltage is derived from the winding 5 in which an alternating voltage is set up simultaneously with the setting up of the alternating voltage in the winding 6. The winding 5 is connected in series with the condenser 13 at the point y, and the votage between y and z, or the ground, is superimposed upon this unidirectional voltage of the condenser. The voltage of winding 5 is represented by the curve C of Fig. 3, and the resultant superimposed voltage, such as is impressed between the positive bus-bar and ground is represented by the curve B of Fig. 3.

The method of producing an alternative wave superimposed upon a negative unidirectional voltage is as follows: Let it be assumed that the terminal of winding 7 is positive. Current will accordingly flow over conductors 14 and 20, through condenser 19, across the gap of the rectifier 16, between the anode 17 and the cathode 15, thence over conductor 9 to the upper terminal of winding 7. This will charge the condenser 19, making its lower plate positive and its upper plate negative, so that a negative potential will be applied to the negative bus-bar. Simultaneously will be applied, by means of the winding 5, an alternating wave similar to that of curve C of Fig. 3, so that between the negative bus-bar and ground there will be an alternating wave superimposed upon a negative direct voltage. When the upper terminal of winding 7 becomes positive no current will pass through the rectified 16, and the condenser 19 will cease to be charged and will begin to discharge, causing a slight falling off in its voltage. Owing to its large capacity, it will, however, continue to apply a negative unidirectional voltage to the negative bus-bar.

It will be seen, therefore, that by means of the arrangement shown in Fig. 1 positive and negative superimposed ringing voltages may be created from alternating current sources without the use of direct current potentials.

The arrangement shown in Fig. 4 is a modification of part of the circuit shown in Fig. 1, and it illustrates how the variation of the output of the condenser 13 may be maintained within narrow limits. In the arangement of Fig. 4, in which the same designating numerals have been used as in Fig. 1, the winding 6 is connected with the circuit containing the condenser 13 and the rectifier 9. The cathode of this rectifier is energized by the winding 23'. Current will be set up in these windings by the primary winding 3 connected with the source 1 of 20 cycle ringing current as in Fig. 1 A voltage will therefore be set up across the plates of the condenser 13. This condenser is connected with the positive bus-bar in shunt with a retard coil 28 and a second condenser 13', which latter condenser will be charged by what may be termed the primary condenser 13. The condenser 13 acts as a reservoir to store up energy from the winding 6 and to feed it through the retard coil 28 to the condenser 13 as it is needed by the latter condenser to supply the unidirectional positive potential between the positive bus-bar and ground. The superimposed alternating voltage is supplied by the winding 5 connected in series with the condenser 13' by means of the conductor 21. While Fig. 4 shows only a modification of circuit 1 for the positive superimposed wave, it will readily be seen that the circuit of Fig. 1 for the negative wave may be modified in the same way, so that substantially uniform unidirectional voltages of both polarities may be obtained.

While this invention has been disclosed as embodied in particular forms, it is to be understood that it is not so limited, but is capable of embodiment in other forms within the spirit and scope of the appended claims.

What is claimed is:

1. In a superimposed ringing system, the combination with a source of alternating current of a multi-winding transformer of which the primary winding is connected with the said source and one secondary winding of which is connected in parallel with a condenser of large capacity, the connection including a rectifier in series with the said winding and said condenser, and another secondary winding being connected between the said condenser and ground, whereby the alternating potential induced in the said second secondary winding will be superimposed upon the unidirectional potential of the said condenser.

2. In a superimposed ringing system, the combination with a plurality of sources of alternating current of a condenser of large capacity, means to charge the said condenser by current from one source during alternate half-cycles, and means to superimpose the alternating current from a second source upon the current flowing from the said condenser during the non-charging interval.

3. In a superimposed ringing system, the combination with a plurality of sources of alternating current of a plurality of condensers, means to charge one condenser by one source during alternate half-cycles, means to charge the other condenser from another source during alternate half-cycles, and means to superimpose the alternating current from a third source upon the currents flowing from each of the said condensers during their respective non-charging intervals.

4. In a superimposed ringing system, the combination with a source of alternating current of a transformer having a primary winding connected with the said source and a plurality of secondary windings, a plurality of rectifiers, a plurality of condensers of large capacity, one side of one of the said secondary windings being connected with the anode of one rectifier the cathode of which is connected with one side of one of the said condensers, the other side of which is connected with the other side of the said secondary winding and also with one terminal of a second secondary winding, the other terminal of which is grounded, a third secondary winding one terminal of which is connected with the cathode of a second rectifier the anode of which is connected with one side of a second condenser, the other side of the said condenser being connected with the other terminal of the third secondary winding and also with the same terminal of the second secondary winding with which the first condenser is connected, and means to heat the cathodes of the said rectifiers.

In testimony whereof, I have signed my name to this specification this 18th day of August 1924.

WILLIAM H. T. HOLDEN.